March 13, 1956 J. MORKOSKI 2,737,868
TRACTOR MOUNTED IMPLEMENT
Filed June 22, 1953 3 Sheets-Sheet 3

INVENTOR
JAMES MORKOSKI
Paul O. Pippel
ATTORNEY

# United States Patent Office 2,737,868
Patented Mar. 13, 1956

2,737,868

TRACTOR MOUNTED IMPLEMENT

James Morkoski, Memphis, Tenn., assignor to International Harvester Company, a corporation of New Jersey Application June 22, 1953, Serial No. 363,038

5 Claims. (Cl. 97—46.95)

This invention relates to agricultural implements and particularly to an implement adapted to be mounted upon a tractor to be propelled thereby and lifted for transport thereon.

The invention is described in its application to a cultivator mounted upon the side of a tractor for vertical movement relative thereto, and on implements of this type the earth working tools are generally mounted by means of pivoted linkage to a supporting frame or bar in such a way as to accommodate relatively free floating movement of the implement in operating position. In conventional implements of this type when the earth penetrating shovels encounter obstructions or hard ground creating excessive draft conditions, the implement tends to rise out of the ground resulting in ununiform operation.

An object of the present invention is the provision of an implement mounted upon a support for floating movement and having means for offsetting the tendency of the earth working tools to rise out of the ground when excess draft is encountered.

Another object of the invention is the provision of an implement, such as a cultivator unit, pivotally connected to a support by vertically spaced linkage, wherein the upper linkage operates to resist the tendency of the tools to rise to a shallow depth or out of the ground.

To accomplish the stated objects, the present invention contemplates the provision of a rockshaft having a lifting connection with the implement upon rocking the shaft in one direction, and functioning to urge the tool into the ground upon rocking the shaft in the other direction, and wherein a link acting in compression connects the implement to the rockshaft and tends to rock the shaft in a direction to hold the tools in the ground when excessive draft is encountered.

Other objects and advantages of the invention will become clear from the following detailed description when read in conjunction with the accompanying drawings, wherein.

Figure 1:
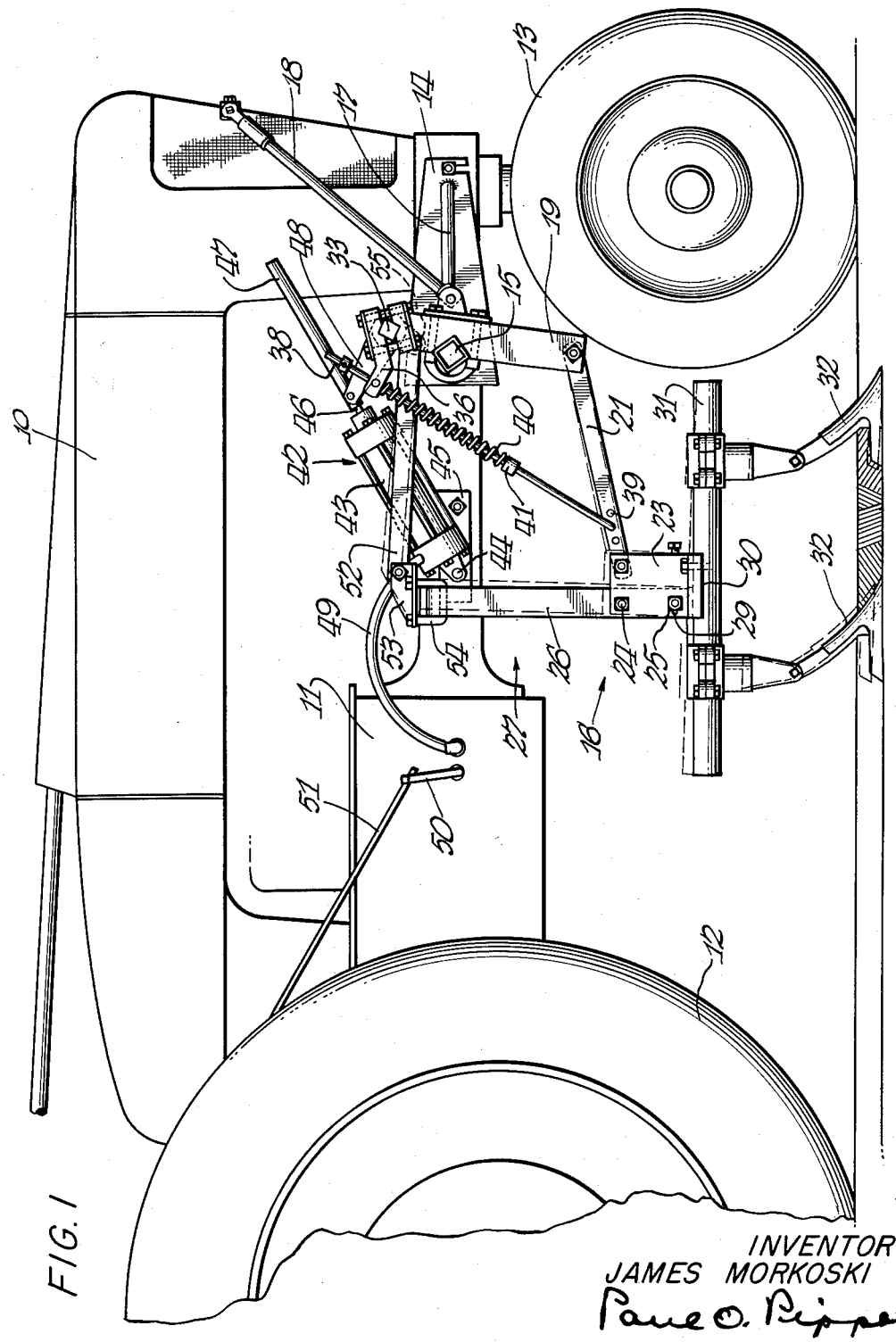
Fig. 1 is a view in side elevation of a tractor having mounted thereon an implement in the form of a cultivator embodying the features of this invention.
Figure 2:
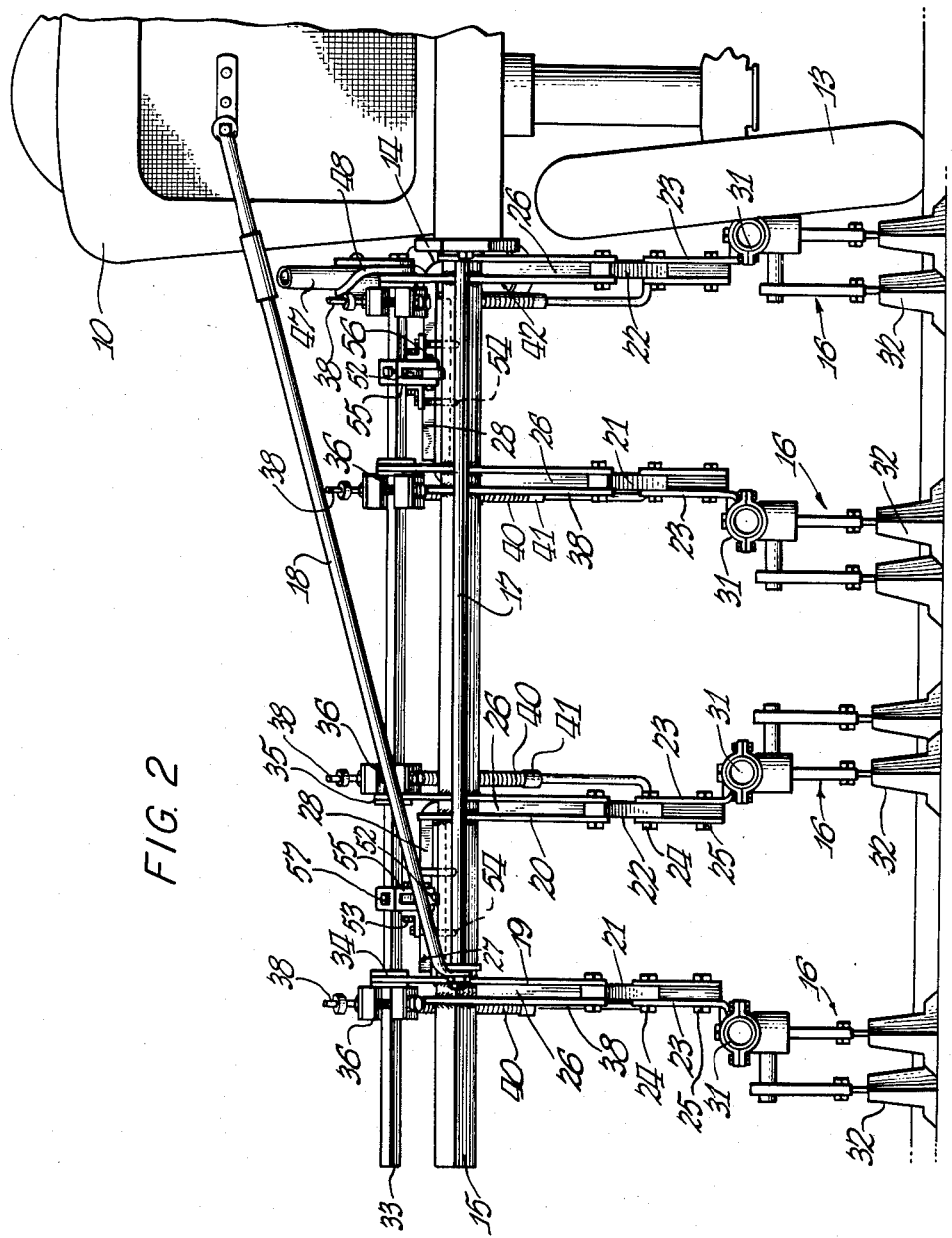
Fig. 2 is a front elevational view of one side of the tractor showing a pair of cultivator units mounted thereon embodying the features of this invention.
Figure 3:
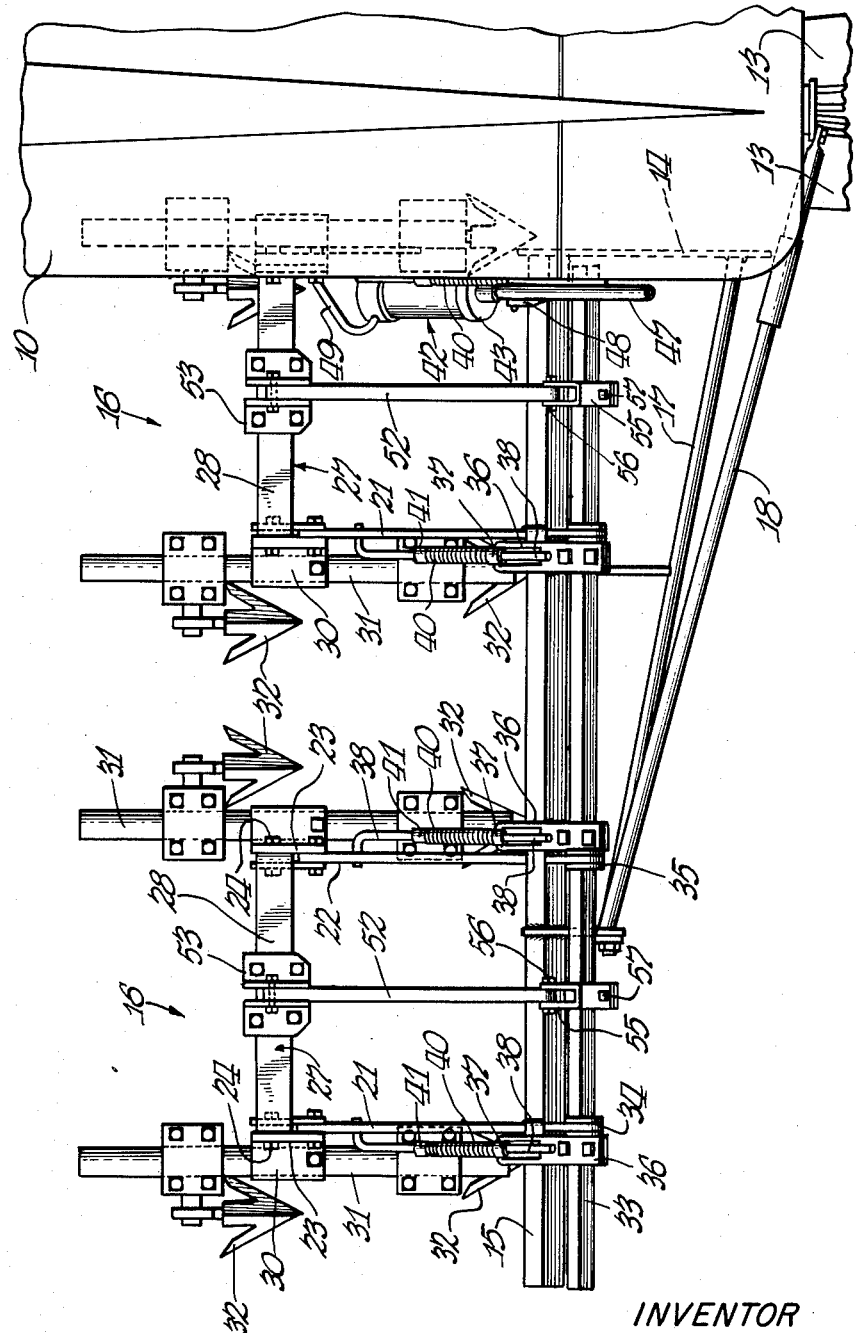
Fig. 3 is a plan view of the structure shown in Fig. 2.

Referring to the drawings, it will be observed that the numeral 10 designates the longitudinally extending body of a tractor having a power plant 11, a pair of laterally spaced rear drive wheels 12, only one of which is shown, and dirigible front wheels 13. The tractor is of the tricycle type and the front wheels 13 are closely spaced under the front end of the tractor body.

Mounted on the side of the tractor body at the forward end thereof is a plate 14 to which is welded the inner end of a laterally extending tool bar 15, which is square in cross-section. Although only one of these tool bars 15 is shown, it may be understood that the opposite side of the tractor 10 is similarly equipped. The tool bar 15 is braced by straps 17 and 18.

The transverse tool bar 15 has mounted thereupon a pair of cultivator units 16. These units are substantial duplicates and a description of one will suffice for both. Each of these units 16 is adapted to cultivate a row of growing crop so that four rows may be cultivated by the units on each side of the tractor body.

Each of the cultivator units 16 is mounted upon the tool bar 15 for vertical movement relative thereto by means including a pair of brackets 19 and 20. Each of these brackets is removably clamped to the tool bar for lateral adjustment thereon. The brackets 19 and 20 comprise spaced plates between the lower ends of which are pivotally mounted rearwardly extending, laterally spaced parallel links 21 and 22. The rear end of each of these links is pivotally connected to a bracket 23 which also comprises a pair of spaced plates adapted to receive the rear ends of the links 21 and 22 therebetween.

Also secured to the plates of the bracket 23 by means of bolts 24 and 25 are the depending laterally spaced arms 26 of a yoke member 27 having an upper transverse portion 28. The arms 26 of the yoke 27 are adjustable relative to the brackets 23 by the provision of a slot 29 in the plates of the bracket 23 to receive the bolt 25. One of the plates of the bracket 23 is provided with a laterally extending flange 30 to which is secured a longitudinally extending cultivator bar 31. Two of these cultivator bars 31 are provided for each unit 16 and have mounted thereupon cultivator shovels 32.

At this point it should be clear that, by virtue of the pivotal connection of the lower parallel links 21 and 22 to the brackets 19 and 20, the cultivator shovels 32 are capable of vertical movement relative to the tractor. Lifting of the earth working tools to transport position is accomplished by mechanism including a transversely extending rockshaft 33, square in cross-section and supported in suitable bearings provided in the extensions 34 and 35 of one of the plates of the brackets 19 and 20 respectively. A plurality of rock arms 36 are provided at laterally spaced locations on the rockshaft 33, one for each of the links 21 and 22 of the cultivator units.

Each of the rock arms 36 has provided at its end a swivel 37 apertured to slidably receive a rod 38, the lower end of which is bent laterally for reception in one or more openings 39 provided in the rear end of the links 21 and 22. Also mounted upon the rod 38 is a spring 40 which surrounds the rod between the swivel 37 and a collar 41 affixed to the rod 38. This spring acts in compression between the rock arm 36 and the links 21 and 22 to urge the shovels 32 toward the ground. It may be understood that a lift rod 38 is provided for each of the rock arms 36 on the shafts 33 for connection with each of the links 21 and 22 of the cultivator units. Thus, in operation of the implement, when excess draft is encountered tending to cause the earth working tools to rise, this upward movement is opposed by the springs 40 on the rod 38. Rocking of the shafts 33 and of the lift arms 36 to raise the earth working units to transport position is accomplished by power lift mechanism including a hydraulic ram unit generally designated by the numeral 42 which includes a cylinder 43 pivotally mounted at 44 upon a plate 45 affixed to the side of the tractor body and a piston rod 46 slidable in the cylinder 43. Rod 46 is slidably received in a sleeve member 47 pivotally mounted upon an arm 48 affixed to the inner end of the rockshaft 33. Fluid under pressure to the ram unit 42 for the extension of the rod 46 therein is supplied to the ram unit through a hose line 49 connected to a suitable source of fluid under pressure supplied by power derived from the tractor power plant. The direction of fluid to and from the cylinder 43 is accomplished by the manipulation of a control lever 50 and a rod 51 extending to a location accessible to the tractor operator. Piston rod 46 engages a suitable stop provided in the sleeve 47, and extension thereof in the cylinder 43 rocks the arm 48 and the shaft 33 in a clockwise direction as viewed in Fig. 1, to raise the implement to a transport position on the tractor. Release of fluid from the ram unit 42 to allow it to return to the supply source on the tractor permits the implement to return to its operating position.

Normal vertical movement of the implement relative to the tractor in operation is permitted by the sliding of the rod 38 relative to the arm 36. This freedom of suspension of the implement would cause the working tools to rise excessively when abnormal draft conditions are encountered, such as obstructions and hard ground. In order to overcome this tendency and to maintain the earth working tools at a uniform depth of operation in the ground, an upper compression link 52 is provided pivotally connected at its rear end to a clamp 53 secured to the transverse portion 28 of the yoke 27 wherein the arms 26 preferably are separable and each is provided with laterally projecting portions secured together by U-bolts 54 carried by the clamp 53 to form the transverse portion 28 of the yoke. The link 52 extends forwardly between the laterally spaced parallel lower links 21 and 22, forming a triangle therewith, and the forward end of link 52 is pivotally connected to the lower end of a rock arm 55 by means of a pivot bolt 56. Rock arm 55 is adjustably secured to the rockshaft 33 by means of a set screw 57. When the earth penetrating shovels 32 encounter abnormal draft conditions the tendency thereof is to rise out of the ground. The implement moves into the dotted line position of Fig. 1 from the solid line position thereof, the implement pivoting upwardly about its forward end and about the point of the forward shovel 32 in the ground. This movement causes the link 52 to move forwardly and exert a pressure upon the rock arm 55 to rock the shaft 33 in a counterclockwise direction as viewed in Fig. 1. The effect of this action is to cause the rock arm 36 to exert pressure downwardly through the spring 40 and rod 38 upon the earth working tools 32 to hold them in the ground. Thus, the tendency of the tools to rise to a shallower position is resisted by the tools in upward movement about the pivotal connections of links 21 and 22 to the bracket 19.

It should be clearly understood from the foregoing description that applicant has devised a novel mounting for a tractor-supported implement by which the implement's selected operating depth in the ground is automatically maintained.

Having described the implement of this invention in its preferred embodiment only, it should likewise be understood that modifications may be made therein without departing from the spirit of the invention or the scope of the appended claims.

What is claimed is:

1. In an implement attachment for a tractor having power lift mechanism thereon, an implement support and a rockshaft rocked by power from the power lift mechanism, the combination of linkage pivotally connected at one end to the support and at the other end to the implement for vertical swinging movement of the later between operating and transport positions and for forward tilting of the implement about said pivotal connection when excessive draft is encountered in operation, a lift arm on the rockshaft connected to the implement by means accommodating lifting the implement upon rocking the shaft in one direction and urging the implement downwardly upon rocking the shaft in the other direction, a force-exerting link pivotally connected at its rear end to the implement at a location vertically spaced above the connection thereof to the tool support and operatively connected at its forward end to said rockshaft to rock the latter in a direction to urge the implement downwardly upon forward tilting thereof in response to excessive draft thereon.

2. In an implement attachment for a tractor having power lift mechanism thereon, an implement support and a rockshaft rocked by power from the power lift mechanism, the combination of linkage extending longitudinally of the direction of travel pivotally connected at its forward end to the implement support and at its rear end to the implement, a lift arm on the rockshaft connected to said linkage by means accommodating lifting the implement upon rocking the rockshaft in one direction and urging the implement to its work upon rocking said shaft in the other direction, said implement being tiltable forwardly about the pivotal connection thereof to said linkage when an obstruction is encountered thereby, and a force-exerting connection between the implement and the rockshaft operative when the implement encounters an obstruction to rock the shaft in a direction to urge the implement to its work.

3. The invention set forth in claim 2 wherein the force-exerting connection is an upper link vertically spaced above said linkage and connected at its rear end to the implement and at its forward end to another arm on the rockshaft and acting in compression, upon forward tilting of the implement about its pivotal connection to the linkage.

4. In an implement attachment for a tractor having power lift mechanism thereon, an implement support and a rockshaft rocked by power from the power lift mechanism, the combination of laterally spaced lower links pivotally connected to and extending forwardly from the implement and pivotally connected at their forward ends to the implement support for vertical swinging movement between operating and transport positions, a lift arm on said rockshaft connected to one of said lower links by means accommodating lifting the implement upon rocking the rockshaft in one direction and urging the implement to its work upon rocking said shaft in the opposite direction, another arm on said rockshaft, and an upper link vertically spaced above said lower links, said upper link being pivotally connected at its rear end to the implement and at its forward end to said other arm and operative when excessive draft force is encountered by the implement tending to lift it to exert pressure against said other arm to rock the rockshaft in the direction to urge the implement to its work.

5. The invention set forth in claim 4 wherein the implement is provided with an upright member rigid therewith to which the rear end of the upper link is pivotally connected, and said upper link is in forwardly converging relation with respect to the plane of said lower links.

References Cited in the file of this patent

UNITED STATES PATENTS

| | | |
|---|---|---|
| 672,572 | Schley | Apr. 23, 1901 |
| 1,868,307 | Brown | July 19, 1932 |
| 2,445,145 | Love | July 13, 1948 |
| 2,515,637 | Dooley et al. | July 18, 1950 |
| 2,560,636 | Crenshaw | July 17, 1951 |
| 2,660,939 | Pool et al. | Dec. 1, 1953 |